(12) United States Patent
Athad

(10) Patent No.: US 10,010,942 B2
(45) Date of Patent: Jul. 3, 2018

(54) CUTTING TOOL AND CUTTING INSERT HAVING A DEEP BLIND OPENING

(71) Applicant: Iscar, Ltd., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 219 days.

(21) Appl. No.: 15/186,933

(22) Filed: Jun. 20, 2016

(65) Prior Publication Data

US 2017/0361381 A1 Dec. 21, 2017

(51) Int. Cl.
*B23B 27/04* (2006.01)
*B23B 27/16* (2006.01)
(Continued)

(52) U.S. Cl.
CPC ........ *B23B 27/1622* (2013.01); *B23B 27/045* (2013.01); *B23B 27/1614* (2013.01);
(Continued)

(58) Field of Classification Search
CPC .............. B23B 2205/02; B23B 29/043; B23B 2200/16; B23B 2200/3618;
(Continued)

(56) References Cited

U.S. PATENT DOCUMENTS 141,427 A * 8/1873 Crookes .................. B23D 61/06
83/841

195,699 A * 10/1877 Burger ................... B23D 61/06
76/80
(Continued)

FOREIGN PATENT DOCUMENTS

| CN | 1104138 A | 6/1995 |
|---|---|---|
| EP | 0 896 848 A2 | 2/1999 |

(Continued)

OTHER PUBLICATIONS

International Search Report dated Oct. 11, 2017, issued in PCT counterpart application (No. PCT/IL2017/050579).
(Continued)

*Primary Examiner* — Sara Addisu
(74) *Attorney, Agent, or Firm* — Womble Bond Dickinson (US) LLP

(57) ABSTRACT

A non-indexable, one-sided cutting insert includes opposite insert side surfaces which define an insert width therebetween, opposite insert front and rear surfaces which extend between the insert side surfaces and define an insert depth therebetween and opposite insert top and bottom surfaces which extend between the insert side surfaces and the insert front and rear surfaces. The insert top and bottom surfaces define an insert height therebetween. The insert further includes a main cutting edge formed at an intersection between the insert top and front surfaces. A maximum value of the insert width is smaller than minimum value of the insert height, and a minimum value of the insert depth. The insert includes a deep opening which opens out only to the insert bottom surface and defines an opening depth. A depth ratio defined between the opening depth and the insert height is greater than 0.3.

23 Claims, 3 Drawing Sheets

(51) Int. Cl.
*B23C 5/22* (2006.01)
*B23C 5/18* (2006.01)

(52) U.S. Cl.
CPC .............. *B23C 5/18* (2013.01); *B23C 5/2204* (2013.01); *B23C 5/2213* (2013.01); *B23B 2200/16* (2013.01); *B23B 2200/3618* (2013.01); *B23B 2205/02* (2013.01); *B23B 2205/12* (2013.01); *B23C 2200/16* (2013.01); *B23C 2200/361* (2013.01); *B23C 2210/161* (2013.01); *B23C 2210/168* (2013.01)

(58) Field of Classification Search
CPC .............. B23B 2205/12; B23B 27/045; B23B 27/1614; B23B 27/1622; B23C 5/08; B23C 2210/161; B23C 2200/16; B23C 2200/361; B23C 2210/168; B23C 5/22; B23C 5/2204; B23C 5/221
See application file for complete search history.

(56) References Cited

U.S. PATENT DOCUMENTS

| | | | | |
|---|---|---|---|---|
| 416,094 | A | * | 11/1889 | Day ...................... B23D 61/065 83/836 |
| 784,113 | A | * | 3/1905 | Miner .................... B23D 61/06 83/841 |
| 1,700,333 | A | * | 1/1929 | Pond ..................... B23C 5/2462 407/36 |
| 1,708,131 | A | * | 4/1929 | Guindon ................ B23D 61/06 83/840 |
| 2,203,104 | A | * | 6/1940 | Reaney .................. B23B 27/16 407/108 |
| 3,447,578 | A | * | 6/1969 | Mitten .................. B27L 11/005 144/218 |
| 3,885,488 | A | * | 5/1975 | Evancic ................ B23D 61/06 56/295 |
| 3,887,975 | A | * | 6/1975 | Sorice ................... B23C 5/2265 407/106 |
| 3,986,237 | A | * | 10/1976 | Hertel ................... B23B 27/16 407/107 |
| 4,169,690 | A | * | 10/1979 | Kendra ................ B23B 27/065 407/103 |
| 4,480,950 | A | | 11/1984 | Kraft et al. |
| 4,509,886 | A | * | 4/1985 | Lindsay ................ B23B 27/04 407/102 |
| 4,524,664 | A | * | 6/1985 | Tuomaala ............. B23D 61/06 83/840 |
| 4,938,640 | A | | 7/1990 | Pano et al. |
| 4,946,319 | A | * | 8/1990 | Lyon ..................... B23B 27/045 407/115 |
| 4,992,007 | A | * | 2/1991 | Satran ................... B23B 27/045 407/110 |
| 5,004,379 | A | * | 4/1991 | Little ................... B23B 27/065 407/113 |
| 5,035,545 | A | | 7/1991 | Zinner |
| 5,150,992 | A | * | 9/1992 | Friedmann ........... B23B 27/045 407/110 |
| 5,308,197 | A | * | 5/1994 | Little ................... B23B 27/065 407/101 |
| 5,346,335 | A | | 9/1994 | Harpaz et al. |
| 5,803,675 | A | | 9/1998 | Von Haas |
| 5,829,423 | A | * | 11/1998 | Benz ..................... B23D 61/06 125/13.01 |
| 5,829,924 | A | * | 11/1998 | Oshnock .............. B23B 27/045 407/110 |
| 5,836,723 | A | * | 11/1998 | Von Haas ............. B23B 27/04 407/102 |
| 6,234,727 | B1 | | 5/2001 | Barazani |
| 6,325,574 | B1 | * | 12/2001 | Treige .................. B23C 5/08 407/35 |
| 6,565,292 | B2 | | 5/2003 | Hecht |
| 7,090,443 | B2 | * | 8/2006 | Hecht ................... B23B 27/04 407/115 |
| 7,163,361 | B2 | | 1/2007 | Hecht |
| 7,326,006 | B2 | | 2/2008 | Hecht et al. |
| 7,578,640 | B2 | | 8/2009 | Hecht |
| 7,887,266 | B2 | | 2/2011 | Hecht |
| 7,972,090 | B2 | * | 7/2011 | Jonsson ................ B23B 27/045 407/103 |
| 8,376,664 | B2 | * | 2/2013 | Hecht ................... B23B 27/045 407/107 |
| 8,381,625 | B2 | * | 2/2013 | Lizzi ..................... B23D 61/04 83/835 |
| 8,678,718 | B2 | * | 3/2014 | Hecht ................... B23B 27/1614 407/104 |
| 8,701,529 | B2 | | 4/2014 | Deschenaux et al. |
| 8,708,610 | B2 | | 4/2014 | Hecht |
| 9,050,658 | B2 | * | 6/2015 | Hecht ................... B23B 27/04 |
| 2002/0081165 | A1 | * | 6/2002 | Hecht ................... B23C 5/08 407/110 |
| 2005/0232712 | A1 | * | 10/2005 | Hecht ................... B23B 29/043 407/110 |
| 2007/0086864 | A1 | | 4/2007 | Hecht |
| 2008/0080937 | A1 | * | 4/2008 | Hecht ................... B23B 27/16 407/42 |
| 2008/0152441 | A1 | * | 6/2008 | Andersson ........... B23B 27/065 407/103 |
| 2009/0035076 | A1 | * | 2/2009 | Hecht ................... B23B 27/045 407/113 |
| 2009/0080991 | A1 | * | 3/2009 | Grimm .................. B23C 3/06 409/287 |
| 2009/0226267 | A1 | | 9/2009 | Kovac |
| 2010/0104384 | A1 | * | 4/2010 | Orlov ..................... B23C 5/109 407/41 |
| 2012/0082519 | A1 | * | 4/2012 | Hecht ................... B23B 29/043 407/33 |
| 2013/0129434 | A1 | * | 5/2013 | Bhagath ............... B23C 5/08 407/51 |
| 2013/0156516 | A1 | * | 6/2013 | Hecht ................... B23B 27/045 407/103 |
| 2013/0170918 | A1 | * | 7/2013 | Hecht ................... B23B 27/045 407/110 |
| 2014/0050542 | A1 | * | 2/2014 | Zeeb ..................... B23B 27/04 407/103 |
| 2014/0178136 | A1 | * | 6/2014 | Mokthar ............... B23C 5/2406 407/51 |
| 2014/0234040 | A1 | * | 8/2014 | Hecht ................... B23B 27/04 407/107 |
| 2014/0321929 | A1 | * | 10/2014 | Bhagath ............... B23B 27/045 407/109 |
| 2017/0136549 | A1 | * | 5/2017 | Athad ................... B23B 27/145 |

FOREIGN PATENT DOCUMENTS

| | | | | |
|---|---|---|---|---|
| EP | | 1591179 A2 | * 11/2005 | .......... B23B 27/04 |
| JP | | 01115504 A | * 5/1989 | .......... B23B 27/045 |
| JP | | 10315012 A | * 12/1998 | .......... B23B 27/04 |
| WO | WO 2005/120755 A1 | | 12/2005 | |

OTHER PUBLICATIONS

Written Opinion dated Oct. 11, 2017, issued in PCT counterpart application (No. PCT/IL2017/050579).

* cited by examiner

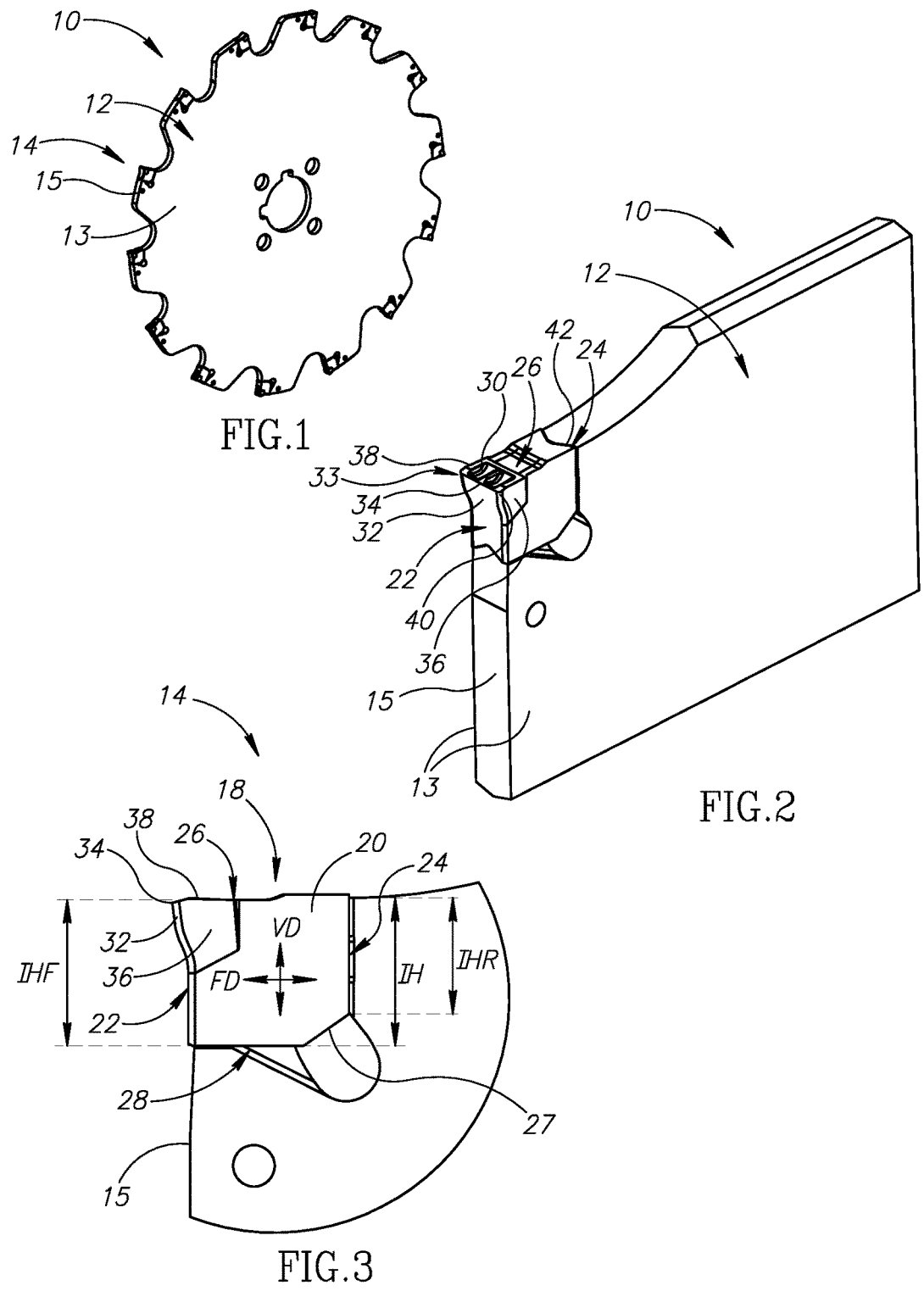

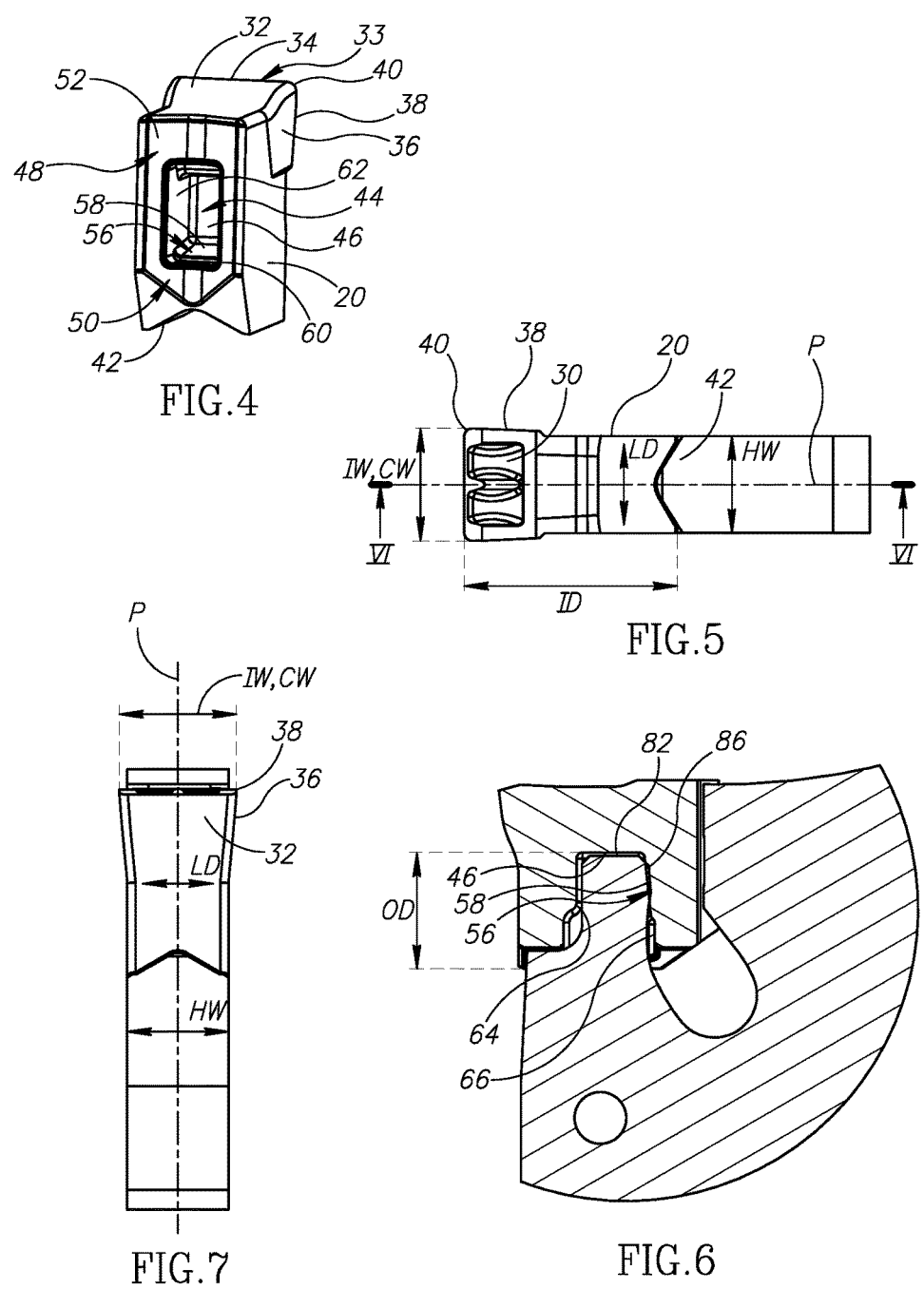

CUTTING TOOL AND CUTTING INSERT HAVING A DEEP BLIND OPENING

FIELD OF THE INVENTION

The subject matter of the present application relates to disc-shaped milling tools and turning tools which have narrow cutting portions and narrow cutting inserts secured therein.

BACKGROUND OF THE INVENTION

U.S. Pat. No. 7,163,361B2 discloses a cutting tool of the abovementioned field, which includes an insert holder and a narrow cutting insert secured in a pocket therein. The insert has an open design, in the sense that it includes an extension, or root portion that extends outwardly downwards from a bottom surface. In an assembled position of the cutting tool, the extension is wedged between a flexible jaw and a non-flexible jaw in the pocket. Due to the open design of the insert, the flexible jaw externally abuts the root portion. Furthermore, it is well known in the field that a longer wedge arrangement performs better than a shorter one.

SUMMARY OF THE INVENTION

In accordance with a first aspect of the subject matter of the present application there is provided a non-indexable, one-sided cutting insert comprising:
  opposite insert side surfaces defining a virtual plane located midway therebetween;
  a lateral direction passing through the side surfaces perpendicularly to the plane;
  opposite insert front and rear surfaces extending between the insert side surfaces;
  a forward-rearward direction passing through the front and rear surfaces perpendicularly to the lateral direction;
  opposite insert top and bottom surfaces extending between the insert side surfaces;
  a vertical direction passing through the top and bottom surfaces perpendicularly to the forward-rearward and lateral directions; and
  a cutting edge formed at an intersection between the insert top and front surfaces;
  the insert having an insert width measured in a front view thereof, between the insert side surfaces in the lateral direction;
  the insert having an insert depth measured in a side view thereof, between the insert front and rear surfaces in the forward-rearward direction;
  the insert having an insert height measured in a front view thereof between the insert top and bottom surfaces in the vertical direction;
  a maximum value of the insert width being smaller than a minimum value of the insert height, and smaller than a minimum value of the insert depth;
  wherein
  the insert comprises a deep opening which opens out only to the insert bottom surface and has an opening depth measured in the vertical direction; and wherein a depth ratio between the opening depth and the insert height, is greater than 0.3.

In accordance with a second aspect of the subject matter of the present application there is further provided a non-indexable, one-sided narrow-width cutting insert comprising:
  opposite insert side surfaces,
  opposite insert front and rear surfaces extending between the insert side surfaces;
  and
  opposite insert top and bottom surfaces extending between the insert side surfaces and the insert front and rear surfaces, only the insert top surface comprising a rake surface,
  the insert front surface comprising a front relief surface intersecting the rake surface at a main cutting edge,
  the insert rear surface comprising a v-shaped insert rear locating surface;
  the insert bottom surface comprising a v-shaped insert bottom locating surface intersecting the insert front surface;
  wherein
  only the insert rear and bottom surfaces comprise surfaces configured for abutment; and wherein the insert comprises only a single deep blind opening which opens out only to the insert bottom surface and comprises an insert wedge abutment surface which faces away from the insert rear surface and is located closer thereto than the insert front surface.

In accordance with a third aspect of the subject matter of the present application there is further provided an insert holder having a blade shape or a disc shape with opposite holder side surfaces and a holder peripheral surface extending therebetween and comprising a pocket,
  the pocket comprising:
  a non-resilient base jaw,
  a resilient jaw located opposite the base jaw and being elastic and flexible relative thereto, the resilient jaw and base jaw together having unitary one-piece construction; and
  a pocket resilience slot extending between the resilient and base jaws;
  the resilient jaw comprising a base portion extending between the holder side surfaces and the holder peripheral surface and a wedge projection which extends outwardly away from the base portion,
  wherein
  the base portion comprises a resilient jaw locating surface which connects the holder peripheral surface with the wedge projection.

In accordance with a fourth aspect of the subject matter of the present application there is further provided a cutting tool which includes the insert holder and any one of the above cutting inserts secured in the pocket.

Any of the following features, either alone or in combination, may be applicable to any of the above aspects of the subject matter of the application:
  Preferably, the insert includes only a single deep opening.
  The opening can be unthreaded.
  The opening can include an insert wedge abutment surface which is located closer to the insert rear surface than the insert front surface, and faces away from the insert rear surface.
  A portion of the insert wedge abutment surface can be located closer to the insert top surface than the insert bottom surface.
  The insert wedge abutment surface can be at least partially planar.
  The inner insert wedge abutment surface can be entirely located between the insert side surfaces.
  The opening extends in the vertical direction.

Preferably, only the insert top surface includes a rake surface and the insert front surface can include a front relief surface which intersects the rake surface at the main cutting edge.

The insert rear surface can include an insert rear locating surface and the insert bottom surface can include an insert bottom locating surface.

The insert bottom locating surface can extend from the insert front surface to the opening, preferably in the forward-rearward direction.

The insert bottom locating surface is located closer to the insert front surface than the insert rear surface.

The insert rear locating surface and the insert bottom locating surface can have V-shaped cross-sections taken perpendicular to a longitudinal direction thereof.

The insert top and front surfaces are preferably devoid of abutment surfaces.

The opening can be centrally located in the insert bottom surface in a longitudinal direction thereof.

In an assembled, non-operative position, only the following surfaces engage each other:
an inner surface of the opening abuts the resilient jaw,
the insert rear surface abuts the base jaw, and
the insert bottom surface abuts the resilient jaw locating surface.

The opening can include comprises a confined insert wedge abutment surface which abuts the wedge projection.

The insert wedge abutment surface preferably abuts the wedge projection at a region closer to the insert top surface than the insert bottom surface.

The base jaw can include a pullout prevention arrangement and the cutting insert includes a step in the insert rear surface configured to interact therewith.

The insert rear base jaw can include a base jaw resilience slot which separates the base jaw into a resilient upper jaw portion and a non-resilient lower jaw portion; and
the pullout prevention arrangement can include a knurled forcing mechanism which is configured to move the upper jaw portion away from the lower jaw portion.

BRIEF DESCRIPTION OF THE DRAWINGS

For a better understanding of the subject matter of the present application and to show how the same may be carried out in practice, reference will now be made to the accompanying drawings, in which:

FIG. 1 is an isometric view of a disc-shaped saw;

FIG. 2 is an isometric view of a blade-shaped turning tool;

FIG. 3 is a side view of a cutting portion of either one of the tools of FIGS. 1 and 2 showing an insert seated in a pocket;

FIG. 4 is a bottom isometric view of the insert of FIG. 3;

FIG. 5 is a top view of the cutting portion of FIG. 3;

FIG. 6 is a cross-sectional view taken along line VI-VI of FIG. 5;

FIG. 7 is a front view of the cutting portion of FIG. 3;

Figure 9:
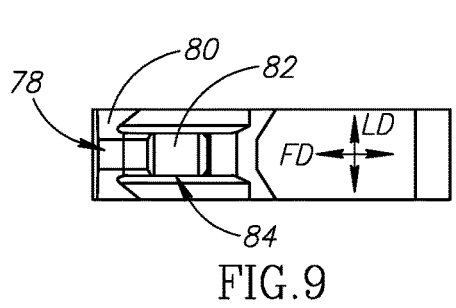
FIG. 9 is a top view of the pocket of FIG. 8.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Reference is made to FIGS. 1 and 2. A cutting tool 10 includes an insert holder 12 with at least one narrow cutting portion 14 which includes a pocket 16 and a cutting insert 18 wedged, or secured therein. The holder 12 includes opposite holder side surfaces 13 and a holder peripheral surface 15 extending therebetween.

The holder 12 can be blade-shaped, or it can be a rotating, disc-shaped tool, e.g., a slotting cutter. The holder 12 is preferably made of steel. At least at the cutting portion 14, the holder side surfaces 13 are parallel and define a holder width HW therebetween (as shown in FIGS. 5 and 7). The holder width HW is the smallest external dimension of the holder 12, as measured when viewed in any external view, i.e., front, top, bottom or side view. In FIGS. 1 and 2, the two types of the cutting tool 10 of the field are shown in an assembled position, in which the cutting insert 18 is secured in the pocket 16 and the cutting tool 10 is non-operative (i.e., not performing a machining operation).

The cutting insert 18 is typically made of extremely hard and wear-resistant material such as cemented carbide, either by form-pressing or by injection molding and sintering carbide powders in a binder. The cemented carbide may be, for example, tungsten carbide. The cutting insert 18 may be coated or uncoated.

Attention is drawn to FIGS. 3 to 6. The cutting insert 18 is non-indexable and one-sided, i.e., non-reversible. The cutting insert 18 includes opposite insert side surfaces 20, opposite insert front and rear surfaces 22, 24, and opposite insert top and bottom surfaces 26, 28. The cutting insert has a virtual plane P which is located mid-way between the insert side surfaces (20).

The insert side surfaces 20 define a lateral direction LD which passes therethrough and is perpendicular to the plane P. The insert 18 has an insert width IW measured in a front view thereof, between the insert side surfaces 20 in the lateral direction LD.

The insert top and bottom surfaces 26, 28 define a vertical direction VD which passes therethrough and is perpendicular to the lateral direction LD. In a plan view of either one of the side surfaces 20 (as seen in FIG. 3), the vertical direction VD is also perpendicular to a longitudinal direction of the bottom surface 28. The insert 18 has an insert height IH measured in a front view thereof between the insert top and bottom surfaces 26, 28 in the vertical direction VD. As seen in the side view of FIG. 3, the bottom surface 28 is connected to the rear surface 24 by a rearwardly and upwardly directed transition surface 27. As a consequence, the height IHR of the rear surface 24 is less than the height IHF of the insert's front surface 22.

The insert front and rear surfaces 22, 24 define a forward-rearward direction FD which passes therethrough and is perpendicular to the lateral and vertical directions LD, VD. The insert 18 has an insert depth ID measured in the forward-rearward direction FD between the insert front and rear surfaces 22, 24.

Attention is drawn to FIGS. 3, 5 and 7. A maximum value of the insert width IW, is the smallest external dimension of the insert 18 as viewed from a plan view of either one of: the insert side surfaces (20), insert top and bottom surfaces (26, 126, 28) or insert front and rear surfaces (22, 24, 124). In other words, from an external view of the insert 18 (in any of the abovementioned views), a maximum value of the insert width IW is smaller than a minimum value of the insert height IH, and smaller than a minimum value of the insert depth ID.

It is noted that the words minimum and maximum and are used herein to better define dimensions, where the relevant reference surfaces are not necessarily planar and/or parallel.

The insert front and rear surfaces 22, 24 and the insert top and bottom surfaces 26, 28 extend between the insert side surfaces 20. The insert side surfaces 20 can be at least partially planar and parallel. The insert front and rear surfaces 22, 24 are non-identical. The insert top and bottom surfaces 26, 28 are non-identical and extend between the insert front and rear surfaces 22, 24. Only the insert rear and bottom surfaces 24, 28 are configured for engaging, or abutting, respective surfaces in the pocket 16.

Only the insert top surface 26 includes a cutting edge 33 having a rake surface 30. The cutting edge 33 includes a main cutting edge 34, side cutting edges 38 on either side of the main cutting edge 34 and corner cutting edges connecting the main cutting edge 34 to the side cutting edges 38. The insert front surface 22 includes a front relief surface 32. The insert top surface 26 is not V-shaped in a front view of the insert 18. The insert top surface 26 is not configured for abutment, i.e., it does not include abutment surfaces. The rake surface 30 meets the front relief surface 32 at the main cutting edge 34. The insert side surfaces 20 can include side relief surfaces 36, which meet the rake surface 30 at the side cutting edges 38. The side cutting edges 38 meet the main cutting edge 34 at the corner cutting edges 40.

Attention is drawn to FIGS. 5 and 7. In some embodiments, the corner cutting edges 40 define a cut width CW measured in the lateral direction LD. In these embodiments, the cut width CW represents the largest value of the insert width IW. In these embodiments, the cut width CW is larger than the holder width HW, at least at the cutting portion 14. In some embodiments, the cut width CW may be as narrow as 2 mm.

The insert rear surface 24 includes an insert rear locating surface 42. The insert rear locating surface 42 preferably has a concave V-shaped cross-section taken perpendicular to a longitudinal direction thereof. The insert rear locating surface 42 is configured to engage a corresponding shaped locating surface of the pocket 16. In the assembled position, the insert rear locating surface 42 locates the insert 18 in both the forward-rearward direction FD, and the lateral direction LD.

As seen in FIGS. 4 and 6, the insert 18 includes a deep blind opening 44, or a non-through cavity, which opens out only to the insert bottom surface 28. Only the bottom surface 28 includes the opening 44. The opening 44 is unthreaded. The opening 44 is preferably located in a longitudinal center of the insert bottom surface 28. The opening 44 does not open out to the insert side surfaces 20, nor does it open out to the insert top surface 26, which advantageously strengthens the insert 18 compared to inserts with an open design. In other words, compared to inserts with through holes, or openings, in respective top surface or side surfaces, the insert 18 has a closed, rigid design.

The opening 44 has an opening inner end 46 located at an inner-most portion thereof. The opening 44 has an opening depth OD defined as a distance between the insert bottom surface 28 and the opening inner end 46, measured in the vertical direction VD. The insert 18 has a depth ratio DR defined as a ratio between the opening depth OD and the insert height IH. More accurately, the depth ratio DR can be defined between a maximum value of the opening depth OD and a minimum value of the insert height IH. The depth ratio DR=OD/IH is larger than 0.3, and preferably larger than 0.5. The above depth ratio DR definition applies to any insert 18 size. As known in the field, an advantage of having this depth ratio DR range is achieving larger wedge forces. In other words, a deeper opening 44 means better clamping/wedging of the insert 18 in the pocket 16. And since the insert 18 is resiliently clamped, the insert preferably is devoid of a clamping through hole configured to receive a clamping screw for mounting the cutting insert onto a tool holder.

The insert bottom surface 28 includes bottom front and rear surfaces 48, 50. The opening 44 opens out to the insert bottom surface 28 between the bottom front and rear surfaces 48, 50 in the forward-rearward direction FD. The bottom front and rear surfaces 48, 50 preferably are at the same level in the vertical direction VD. In some embodiments, the bottom front and rear surfaces 48, 50 are located at the same distance from the insert top surface 26. The insert bottom surface 28 includes an insert bottom locating surface 52 which is located closer to the insert front surface 22 than the insert rear surface 24. The insert bottom locating surface 52 can extend from the insert front surface 22 towards the insert rear surface 24 in the forward-rearward direction FD. The insert bottom locating surface 52 can have a concave V-shaped cross-section taken perpendicular to a longitudinal direction thereof. The insert bottom locating surface 52 is configured to engage a corresponding surface in the pocket 16. The insert bottom locating surface 52 locates the insert 18 in the vertical direction VD. In other words, the insert bottom locating surface 52 is a vertical stopping surface. The insert bottom locating surface 52 also locates the insert 18 in the lateral direction LD.

The elongated opening 44 is configured to receive an elongated wedge projection 54 of the pocket 16. The opening 44 can have a polygonal shape in a bottom view thereof (FIG. 4), which corresponds to the shape of the wedge projection 54 in a top view thereof (FIG. 9). Preferably, the opening 44 does not have a cylindrical cross section.

The opening 44 includes an inner opening rear surface 56 which extends from the insert bottom surface 28 towards the insert top surface 26 and connects with the opening inner end 46. The opening rear surface 56 engages the wedge projection 54 and is located closer to the insert rear surface 24 than the insert front surface 22.

The confined, distant location of the opening rear surface 56 from the insert front surface 22 and the main cutting edge 34 can advantageously improve thermal isolation of the wedge projection 54, from heat generated by machining. Stated differently, in the assembled position, the wedge projection 54 is located within the opening 44, which can reduce said heat exposure.

The opening rear surface 56 includes an insert wedge abutment surface 58. The insert wedge abutment surface 58 is located, in its entirety, between the insert side surfaces 20. The insert wedge abutment surface (58) can be planar. Preferably, the insert wedge abutment surface (58) intersects a first plane (P1) located midway between is located, in its entirety, closer to the insert top surface 26 than the insert bottom surface 28. This can improve wedging of the insert 18 in the pocket 16, since it allows for a deeper abutment location, and consequently, a longer wedge arrangement, which, as known provides a more stable clamping/wedging compared to a shorter, shallower wedge arrangement. The insert wedge abutment surface (58) is preferably located closer to the insert rear surface 24 than the insert front surface (22) and faces away from the insert rear surface 24. The opening rear surface 56 can also include, adjacent the insert bottom surface 28, a wedge relief surface 60 which can be shorter than the insert wedge abutment surface 58. The wedge relief surface 60 connects to the insert wedge abutment surface 58, and can be slightly inclined thereto. The wedge relief surface 60 is configured to enable smooth/easy sliding of the wedge projection 54 into the opening 44, and consequently the insert 18, into the secure assembled position in the pocket 16.

The opening 44 includes inner opening side walls 62 which extend between the opening rear surface 56 and an opening front surface 64. The opening side walls 62 can advantageously strengthen the insert 18. In a non-operative, assembled position of the insert 18 in the pocket 16, the opening side walls 62 and the opening front surface 64 do not engage any portion of the pocket 16. During an operative position, i.e., during machining, in an unlikely event that lateral machining forces, force the insert 18 in the lateral direction LD, the sidewalls 62 may advantageously engage the wedge projection 54, thereby preventing further movement.

Attention is drawn to FIGS. 6 to 9. The pocket 16 has a resilient jaw 66 which extends in the vertical direction VD. The resilient jaw 66 is elongated in the vertical direction VD. The pocket 16 has a rigid base jaw 68 located opposite the resilient jaw 66, the resilient jaw 66 and the base jaw 68 together having unitary one-piece construction. The pocket 16 has a pocket resilience slot 70 which separates, and extends between, the resilient jaw 66 and the base jaw 68.

The resilient jaw 66 is configured to flex, elastically, with respect to the base jaw 68 to generate wedge forces, to thus secure the insert 18 in the pocket 16 against the base jaw 68. The resilient jaw The resilient jaw 66 has a base portion 72 and the wedge projection 54 which extends therefrom in the vertical direction VD. In the lateral direction, the base portion 72 extends, at least partially, between the holder side surfaces 13. In the forward-rearward direction FD, the base portion 72 has a base portion front surface 74 which intersects the holder peripheral surface 15. The base portion front surface 74. The base portion 72 has a base portion top surface 78 which extends away from the base portion front surface 74

Figure 8:
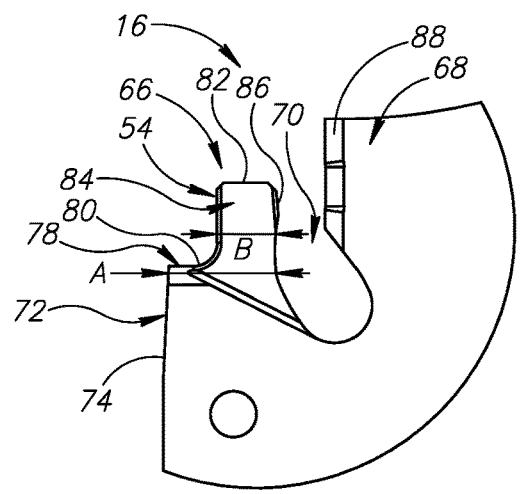
FIG. 8 is a side view of the pocket of FIG. 3 with the insert removed.
Figure 10:
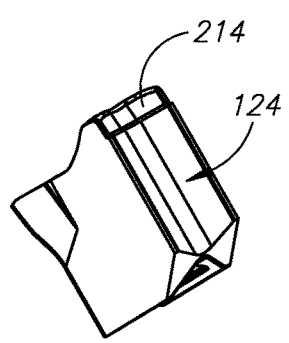
FIG. 10 is a rear isometric view of a second embodiment of the insert.
Figure 12:
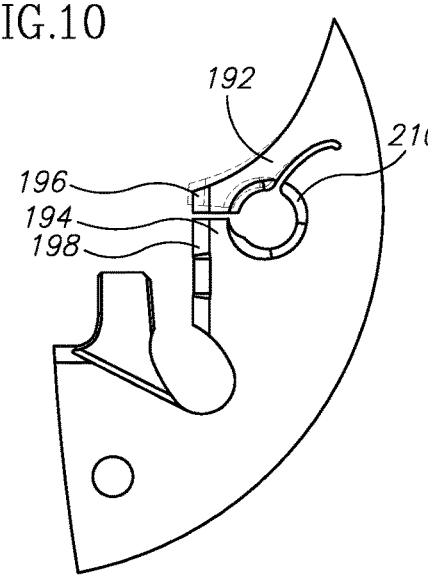
FIG. 12 is a side view of the cutting portion of FIG. 11 with the insert removed.
Figure 11:
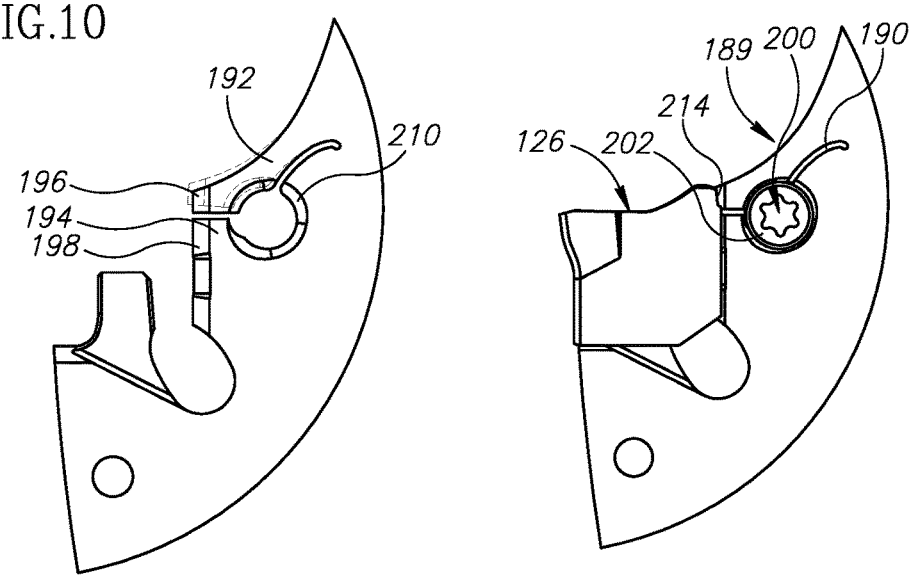
FIG. 11 is a side view of a second embodiment of the cutting portion.

As seen in FIG. 8, in a side view of the pocket 16, measured in a forward-rearward direction FD, the base portion 72 has a base depth A which is larger than a wedge depth B of the wedge projection 54 in the same view. This adds robustness to the resilient jaw 66, compared to jaws known in the field which have a rather constant depth. This also relates to higher resistance against machining-related heat exposure.

The base portion top surface 78 includes a resilient jaw locating surface 80 which faces upwardly in the vertical direction VD and configured to engage the insert bottom surface 28. The resilient jaw locating surface 80 extends in the forward-rearward direction FD from the base portion front surface 74 and connects with the wedge projection 54. The resilient jaw locating surface 80 has a shape which corresponds to the shape of the insert bottom locating surface 52. The resilient jaw locating surface 80 can have a convex V-shaped cross-section taken perpendicular to a longitudinal direction thereof.

The wedge projection 54 includes a projection top surface 82 and a projection peripheral surface 84 which extends between the base portion top surface 78 and the projection top surface 82. The wedge projection 54 extends from the base portion top surface 78 and connects with the resilient jaw locating surface 80. The wedge projection 54 is spaced apart from the base portion front surface 74, and can be spaced apart from the holder side surfaces 13. Stated differently, in a top view (as seen in FIG. 8), the wedge projection 54 can be narrower than the base portion 72 in the forward-rearward direction FD and can be narrower than the base portion 72 in the lateral direction LD.

The projection peripheral surface 84 includes a projection wedge abutment surface 86 which is located within the pocket resilience slot 70 and configured to abut the insert wedge abutment surface 58. The projection wedge abutment surface 86 extends from the projection top surface 82 in the vertical direction VD and faces the base jaw 68.

The base jaw 68 is inelastic relative to the resilient jaw 66, i.e., it is not flexible. The base jaw 68 has a base jaw locating surface 88 which extends from the pocket resilience slot 70 in the vertical direction VD, and faces the resilient jaw 66. The base jaw locating surface 88 can have a convex V-shaped cross-section taken perpendicular to a longitudinal direction thereof. According to the present embodiment, the base jaw locating surface 88 is continuous.

In order to reach the assembled position, the insert 18 is placed in the pocket 16, such that the wedge projection 54 is received into and located in the opening 44, and the insert wedge abutment surface 58 and the insert rear locating surface 42 begin to engage, respectively, the projection wedge abutment surface 86 and the base jaw locating surface 88. To overcome the wedge forces (directed towards the insert 18, mostly in the forward-rearward direction FD), the insert 18 is then forced inwards in the vertical direction VD, elastically flexing the resilient jaw 66, until the insert bottom locating surface 52 abuts the resilient jaw locating surface 80, thereby reaching the assembled position.

In the assembled position, only the following surfaces are in engagement: The projection wedge abutment surface 86 abuts the insert wedge abutment surface 58, the base jaw locating surface 88 abuts the insert rear locating surface 42 and the insert bottom locating surface 52 abuts the resilient jaw locating surface 80. The opening inner end 46 does not make contact with the projection top surface 82.

Preferably, to increase wedge and securing forces, the insert wedge abutment surface 58 abuts the projection wedge abutment surface 86 at an inner-most end, or region, of the opening (44), which is located closer to the insert top surface 26 than the insert bottom surface 28.

Attention is drawn to FIGS. 14 to 16. According to a second embodiment, the holder 112 includes a pullout prevention arrangement 189 located in the base jaw 168.

According to the second embodiment, the base jaw 168 includes a base jaw resilience slot 190, which separates the base jaw 168 into upper and lower jaw portions 192, 194. Consequently, the base jaw resilience slot 190 separates the base jaw locating surface 188 into upper and lower locating sub-surfaces 196, 198. The upper jaw portion 192 is elastic and flexible with respect to the lower jaw portion 194, which is inelastic and non-flexible.

According to the second embodiment, the pullout prevention arrangement 189 can include a knurled arrangement 200 which includes a bolt 202 with a bolt conical surface and a knurled nut with a nut conical surface. On both sides of the base jaw resilience slot 190 (i.e., on the upper and lower jaw portions 192, 194) the holder 112 includes holder conical surfaces 210 on one holder side surface 113 which corresponds to the bolt conical surface 204, and on the other holder side surface 113, the holder 112 includes knurled holder conical surfaces. Rotation of the bolt 202 relative to the knurled nut brings them together, which opens up the base jaw resilience slot 190 and forces the upper jaw portion 192 in the vertical direction VD—away from the lower jaw portion 194. Consequently, the upper locating sub-surface 196 is raised, or protrudes beyond the lower locating sub-surface 198 (in the forward-rearward direction FD), thereby preventing the insert 118 from being pulled out of the pocket 116.

The insert rear surface 124 can include a step 214 which is located adjacent an intersection of the insert rear and top surfaces 124, 126. The shape of the step 214 is configured to correspond to the shape of the upper locating sub-surface 196 of the upper jaw portion 192. In the assembled position, the step 214 is adjacent to, but does not engage, the upper jaw portion 192. In an operative position, i.e., during machining, the insert 118 may slightly shift in the pocket 116, which can cause the step 214 to engage the upper jaw portion 192, thereby preventing further movement of the insert 118.

What is claimed is:

1. A non-indexable, one-sided cutting insert (18, 118) comprising:
   opposite insert side surfaces (20) defining a virtual plane (P) located midway therebetween;
   a lateral direction (LD) passing through the side surfaces (20) perpendicularly to the plane (P);
   opposite insert front and rear surfaces (22, 24, 124) extending between the insert side surfaces (20);
   a forward-rearward direction (FD) passing through the front and rear surfaces (22, 24, 124) perpendicularly to the lateral direction (LD);
   opposite insert top and bottom surfaces (26, 126, 28) extending between the insert side surfaces (20);
   a vertical direction (VD) passing through the top and bottom surfaces (26, 126, 28) perpendicularly to the forward-rearward and lateral directions (FD, LD); and
   a main cutting edge (34) formed at an intersection between the insert top and front surfaces (26, 126, 22);
   the insert (18, 118) having an insert width (IW) measured in a front view thereof, between the insert side surfaces (20) in the lateral direction (LD);
   the insert having an insert depth (ID) measured in a side view thereof, between the insert front and rear surfaces (22, 24, 124) in the forward-rearward direction (FD);
   the insert (18) having an insert height (IH) measured in a front view thereof between the insert top and bottom surfaces (26, 28) in the vertical direction (VD);
   a maximum value of the insert width (IW) being smaller than a minimum value of the insert height (IH), and smaller than a minimum value of the insert depth (ID); wherein
   the insert (18, 118) comprises a deep opening (44) which opens out only to the insert bottom surface (28) and has an opening depth (OD) measured in the vertical direction (VD); and
   wherein a depth ratio (DR) between the opening depth (OD) and the insert height (IH), is greater than 0.3.

2. The cutting insert (18, 118) according to claim 1, wherein the insert (18, 118) comprises only a single deep opening (44).

3. The cutting insert (18, 118) according to claim 1, wherein the deep opening (44) is unthreaded.

4. The cutting insert (18, 118) according to claim 1, wherein the deep opening (44) comprises an insert wedge abutment surface (58) which is located closer to the insert rear surface (24, 124) than to the insert front surface (22), and faces away from the insert rear surface (24, 124).

5. The cutting insert (18, 118) according to claim 4, wherein a portion of the insert wedge abutment surface (58) is located closer to the insert top surface (26, 126) than to the insert bottom surface (28).

6. The cutting insert (18, 118) according to claim 4, wherein the insert wedge abutment surface (58) is at least partially planar.

7. The cutting insert (18, 118) according to claim 1, wherein the deep opening (44) extends in the vertical direction (VD).

8. The cutting insert (18, 118) according to claim 1, wherein only the insert front surface (22) comprises a front relief surface (32) which extends from the main cutting edge.

9. The cutting insert (18, 118) according to claim 1, wherein the insert rear surface (24, 124) comprises an insert rear locating surface (42) and the insert bottom surface (28) comprises an insert bottom locating surface (52).

10. The cutting insert (18, 118) according to claim 9, wherein the insert bottom locating surface (52) extends from the insert front surface (22) to the opening (44) in the forward-rearward direction (FD).

11. The cutting insert (18, 118) according to claim 9, wherein the insert bottom locating surface (52) is located closer to the insert front surface (22) than to the insert rear surface (24, 124).

12. The cutting insert (18, 118) according to claim 9, wherein the insert rear locating surface (42) and the insert bottom locating surface (52) have V-shaped cross-sections, taken perpendicular to a longitudinal direction thereof.

13. The cutting insert (18, 118) according to claim 1, wherein the insert top and front surfaces (22, 26, 126) are devoid of abutment surfaces.

14. The cutting insert (18, 118) according to claim 1, wherein the opening (44) is centrally located in the insert bottom surface (28) in a longitudinal direction thereof.

15. The cutting insert (18, 118) according to claim 1, wherein the deep opening (44) opens out between bottom front and bottom rear surfaces (48, 50) of the insert bottom surface (28), the bottom front and bottom rear surfaces being at the same level in the vertical direction (VD).

16. The cutting insert (18, 118) according to claim 1, wherein:
   the bottom surface (28) is connected to the rear surface (24) by a rearwardly and upwardly directed transition surface (27) such that, in a side view of the insert, a height (IHR) of the rear surface (24) is less than a height (IHF) of the front surface (22); and
   the insert is devoid of a clamping through hole configured to receive a clamping screw for mounting the insert onto a tool holder.

17. A non-indexable, one-sided narrow-width cutting insert (18, 118) comprising:
   opposite insert side surfaces (20),
   opposite insert front and rear surfaces (22, 24, 124) extending between the insert side surfaces (20); and opposite insert top and bottom surfaces (26, 126, 28) extending between the insert side surfaces (20) and the insert front and rear surfaces (22, 24, 124), only the insert top surface (26, 126) comprising a rake surface (30), the insert front surface (22) comprising a front relief surface (32) intersecting the rake surface (30) at a main cutting edge (34), the insert rear surface (24, 124) comprising a v-shaped insert rear locating surface (42);

the insert bottom surface (28) comprising a v-shaped insert bottom locating surface (52) intersecting the insert front surface (22);

wherein only the insert rear and bottom surfaces (24, 124, 26, 126) comprise surfaces configured for abutment; and wherein the insert comprises only a single deep blind opening (44) which opens out only to the insert bottom surface (28) and comprises an insert wedge abutment surface (58) which faces away from the insert rear surface (24, 124) and is located closer thereto than to the insert front surface (22).

18. A cutting tool (10) comprising:

an insert holder (12, 112) having a blade shape or a disc shape with opposite holder side surfaces (13) and a holder peripheral surface (15) extending therebetween and comprising a pocket (16, 116), the pocket (16, 116) comprising:

a non-resilient base jaw (68, 168), a resilient jaw (66) located opposite the base jaw (68, 168) and being elastic and flexible relative thereto, the resilient jaw (66) and the base jaw (68, 168) together having unitary one-piece construction; and a pocket resilience slot (70) extending between the resilient and base jaws (66, 68, 168);

the resilient jaw (66) comprising a base portion (72) extending between the holder side surfaces (13) and the holder peripheral surface (15) and a wedge projection (54) which extends outwardly away from the base portion (72), wherein the base portion (72) comprises a resilient jaw locating surface (80) which connects the holder peripheral surface (15) with the wedge projection (54); and the cutting insert (18, 118) according to either claim 1 or claim 17 secured in the pocket (16, 116).

19. The cutting tool (10) according to claim 18, wherein in an assembled, non-operative position, the resilient jaw's wedge projection (54) is received into the insert's deep opening (44) and only the following surfaces engage each other:

an inner surface of the deep opening (44) abuts the resilient jaw (66), the insert rear surface (24, 124) abuts the base jaw (68, 168), and the insert bottom surface (28) abuts the resilient jaw locating surface (80).

20. The cutting tool (10) according to claim 18, wherein the deep opening (44) comprises a confined insert wedge abutment surface (58) which abuts the wedge projection (54).

21. The cutting tool (10) according to claim 20, wherein the insert wedge abutment surface (58) abuts the wedge projection (54) at a region closer to the insert top surface (26, 126) than the insert bottom surface (28).

22. The cutting tool (10) according to claim 18, wherein the base jaw (68, 168) comprises a pullout prevention arrangement (189) and the cutting insert (118) includes a step (214) in the insert rear surface (124) configured to interact therewith.

23. The cutting tool (10) according to claim 22, wherein the insert rear base jaw (68, 168) comprises a base jaw resilience slot (190) which separates the base jaw (68, 168) into a resilient upper jaw portion (192) and a non-resilient lower jaw portion (194); and wherein the pullout prevention arrangement (189) comprises a knurled forcing mechanism (200) which is configured to move the upper jaw portion (192) away from the lower jaw portion (194).

* * * * *